2,910,820
MOWING MACHINE SHOE

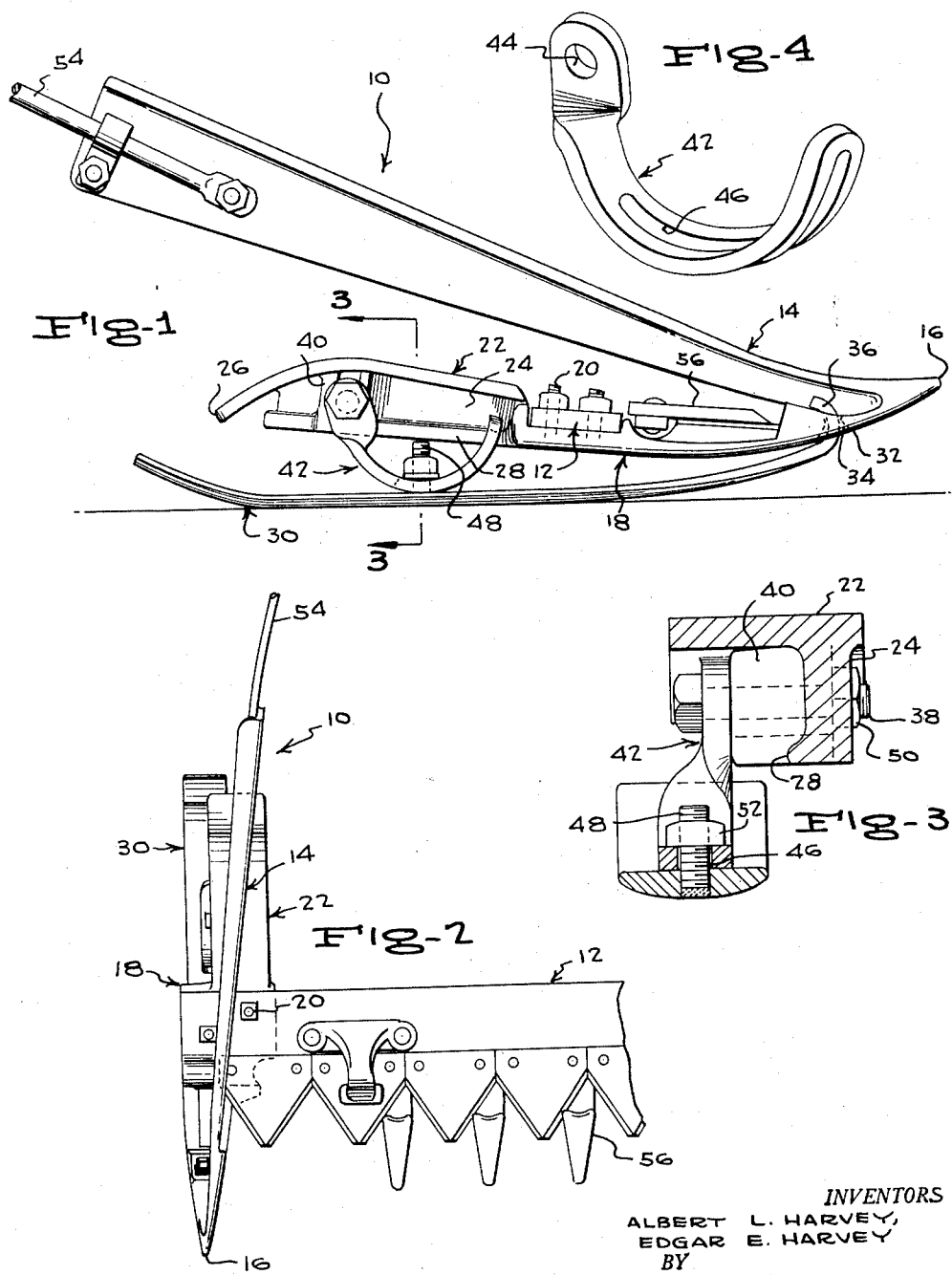

Albert L. Harvey and Edgar E. Harvey, Nortonville, Kans.

Application November 21, 1958, Serial No. 775,596

5 Claims. (Cl. 56—314)

The present invention relates to farm implements generally and in particular to a shoe for the end of a sickle beam of a mowing machine.

The end of the sickle beam of a mowing machine is supported on a shoe which slides over the ground surface as the mowing machine moves forwardly with the mower blade assembly of the machine cutting the hay or other forage crop. A grass divider, in the form of an upwardly and rearwardly extending rod or bar, is carried by the shoe and serves to lay the cut forage crop in the direction away from the forage to be cut so as to leave a clearly defined edge of uncut forage which may be easily followed by the mowing machine operator on the next cutting pass over the field. Frequently, due to field conditions and other reasons, the shoe supporting the free end of the sickle beam of the mowing machine becomes clogged with debris including grass, sod, weeds and the like which have not been engaged by the grass divider. The clogging of the shoe necessitates stopping of the mowing machine and clearing of the debris from the shoe by the operator before the mowing operation may be continued. This results in a loss of time and an expenditure of effort on the part of the mowing machine operator.

An object of the present invention is to provide a shoe for the free end of the sickle beam of a mowing machine which is not clogged by debris even under the most adverse condition of operation of the mowing machine.

Another object of the present invention is to provide a shoe for the sickle beam of a mowing machine which may be adjusted to support the sickle beam in positions toward and away from the ground surface.

A further object of the present invention is to provide a shoe for the sickle beam of a mowing machine which lends itself to rapid and ease of adjustment for heighth of the sickle beam.

A still further object of the present invention is to provide a shoe for the sickle beam of a mowing machine which is sturdy in construction, simple in structure, one economical to manufacture and assemble, and one which is highly effective in action.

These and other objects and advantages of the present invention will be fully apparent from the following description when taken in conjunction with the annexed drawing, in which:

Figure 1 is an elevational view of the mowing machine shoe according to the present invention, seen from the side;

Figure 2 is a top plan view of the assembly shown in Figure 1 with a portion of the sickle beam broken away;

Figure 3 is a view on an enlarged scale, taken on the line 3—3 of Figure 1; and

Figure 4 is an enlarged isometric view of the arcuately bowed arm which connects the runner to the shoe.

Referring in greater detail to the drawing in which like numerals indicate like parts throughout the several views, the device of the present invention comprises a shoe, designated generally by the reference numeral 10, for attachment to the outer end of the mowing machine sickle beam 12. The shoe comprises a longitudinal upwardly and rearwardly extending bar 14 having a forward end 16, constituting a pointed toe.

A horizontally disposed support 18 is fixedly secured below and to the bar 14 and extends rearwardly from the forward end 16 of the bar 14. The support 18 terminates at a point spaced from the forward end 16 of the bar 14 and is connected by means of bolts 20 to the outer end portion of the sickle beam 12, the latter being shown in Figure 2 with the inner end portion broken away.

A shelf 22 projects longitudinally rearwardly from the terminating point of the support 18 and a closure member 24 depends from a side of the shelf 22. The shelf 22 is arcuately shaped, as shown in Figure 1, and has its concave face facing downwardly. The portion 26 of the shelf 22 adjacent its rearward end projects beyond the rearward end of the closure member 24 of the support 18 and has its rearward edge in substantially the same plane as the bottom of the rib 28 projecting from the closure member 24.

A runner 30 is positioned below and longitudinally of the support 18 and the shelf 22 and has its forward end pivotally connected to the forward end 32 of the support 18. The forward end 32 of the support 18 merges with the portion of the bar 14 adjacent the forward end 16. A vertically extending aperture 34 receives the rearwardly turned hook portion 36 of the runner 30 for pivotally connecting the runner 30 to the support 18.

Means is provided connecting the portion of the runner 30 adjacent the rear end to the shelf 22 for movement of the runner 30 toward and away from the shelf 22. This means consists in a bolt 38 extending through an enlarged portion 40 of the closure member 24 and an arcuately bowed arm 42 positioned between the shelf 22 and the runner 30 so that the bowed part rests upon the runner 30 with the free end facing toward the shelf 22, as shown in Figure 1. The bolt 38 extends through a hole 44 provided in the arm 42 inwardly of one end thereof. A closed slot 46 extends inwardly from a point adjacent the other end of the arm 42 to a point spaced from the hole 44. A fastening element, or stud bolt 48, projects upwardly from the runner 30 through the slot 46 and is slidable along the slot 46 when the bolt 38 is loosened. A nut 50 on the bolt 38 tightens the arm 42 in any position of its adjusted movement and another nut 52 on the stud bolt 48 securely holds the runner 30 to the arm 42 when the latter has been shifted to raise or lower the runner 30 with respect to the bar 14.

The bolt 38 constitutes a horizontal axis about which one of the free ends of the arm 42 moves pivotally. The stud bolt 48 constitutes means securing the arm 42 in any position of its adjusted movement and the nut 52 constitutes means securing the stud bolt 48 in any selected position in the slot 46.

A grass divider rod 54 projects rearwardly from the rear end portion of the bar 14 in the conventional manner.

In use, the shoe 10 is secured to the outer end portion of the beam 12 and the runner 30 is shifted toward and away from the support 18 so as to position the runner 30 relative to the beam 12 so that the blade assembly 56 of the beam 12 travels over the ground at the desired heighth. The runner 30 is moved toward and away from the support 18 by adjustment of the arm 42 with the stud bolt 48 traveling in the slot 46 as the arm 42 is manually moved to the selected position.

It will be noted that the space between the underside of the bar 14 and the upper side of the shelf 22 is free of any encumbrance and therefore debris will not gather in the area between the bar 14 and the shelf 22 or support 18.

When the mowing machine to which the shoe 10 is attached is turned or moved in the rearward direction, the portion 26 of the shelf 22 serves to deflect upwardly the debris encountered by the rearward movement of the shoe 10 and prevent clogging of the space between the runner 30 and the support 18 with such debris. Upon forward movement of the mowing machine, the debris caught between the bar 14 and support 18 will not be retained on the support 18 but will be discharged over the rearward end portion 26 of the shelf 22 as the shoe 10 moves forwardly.

What is claimed is:

1. In a shoe for attachment to the outer end of a mowing machine sickle beam, a longitudinally extending bar having a forward end, a horizontally disposed support fixedly secured below and to said bar and extending rearwardly from the forward end of said bar and terminating at a point spaced from the forward end of said bar adapted for connection to the outer end portion of a sickle beam, a shelf having a side and projecting longitudinally rearwardly from the terminating point of said support, a closure member depending from the side of said shelf, and a runner positioned below and longitudinally of said support and secured to said shelf and support.

2. In a shoe for attachment to the outer end of a mowing machine sickle beam, a longitudinally extending bar having a forward end, a horizontally disposed support fixedly secured below and to said bar and extending rearwardly from the forward end of said bar and terminating at a point spaced from the forward end of said bar adapted for connection to the outer end portion of a sickle beam, a shelf having a side and projecting longitudinally rearwardly from the terminating point of said support, a closure member depending from the side of said shelf, and a runner positioned below and longitudinally of said support and having one end pivotally connected to said support and having the portion adjacent the other end adjustably connected to said shelf.

3. A shoe for attachment to the outer end of a sickle beam comprising a longitudinally extending bar extending in an upwardly and rearwardly sloping direction and having on the forward end a pointed toe, a horizontally disposed support fixedly secured below and to said bar and extending rearwardly from the pointed toe and terminating at a point spaced from the pointed toe adapted for connection to the outer end portion of a sickle beam, a shelf having a side and projecting longitudinally rearwardly from the terminating point of said support, a closure member depending from the side of said shelf, a runner positioned below and longitudinally of said support and shelf and having one end pivotally connected to the end of said support adjacent the pointed toe, and means connecting the portion of said runner adjacent the other end to said shelf for movement of said runner toward and away from said shelf.

4. A shoe for attachment to the outer end of a sickle beam comprising a longitudinally extending bar extending in an upwardly and rearwardly sloping direction and having on the forward end a pointed toe, a horizontally disposed support fixedly secured below and to said bar and extending rearwardly from the pointed toe and terminating at a point spaced from the pointed toe adapted for connection to the outer end portion of a sickle beam, a shelf having a side and projecting longitudinally rearwardly from the terminating point of said support, said shelf being arcuately shaped and arranged so that the concave face faces away from said bar, a closure member depending from the side of said shelf, a runner positioned below and longitudinally of said support and shelf and having one end pivotally connected to the end of said support adjacent the pointed toe, and means connecting the portion of said runner adjacent the other end to said shelf for movement of said runner toward and away from said shelf, said means including an arm pivotally connected to said shelf and a fastening element carried by said runner and extending slidably through said arm.

5. A shoe for attachment to the outer end of a sickle beam comprising a longitudinally extending bar extending in an upwardly and rearwardly sloping direction and having on the forward end a pointed toe, a horizontally disposed support fixedly secured below and to said bar and extending rearwardly from the pointed toe and terminating at a point spaced from the pointed toe adapted for connection to the outer end portion of a sickle beam, a shelf having a side and projecting longitudinally rearwardly from the terminating point of said support, said shelf being arcuately shaped and arranged so that the concave face faces away from said bar, a closure member depending from the side of said shelf, a runner positioned below and longitudinally of said support and shelf and having one end pivotally connected to the end of said support adjacent the pointed toe, and means connecting the portion of said runner adjacent the other end to said shelf for movement of said runner toward and away from said shelf, said means including an arcuately bowed arm provided with a closed slot and positioned between said shelf and runner so that the bowed portion rests upon said runner with the free ends facing toward said shelf and having one of the free ends connected to said shelf for pivotal movement about a horizontal axis, a fastening element projecting in an upward direction from said runner and through said closed slot in the bowed part of said arm and slidable along said slot, and means securing said fastening element at a selected position in said slot.

References Cited in the file of this patent

UNITED STATES PATENTS

| | | |
|---|---|---|
| 577,116 | Schuett | Feb. 16, 1897 |
| 1,272,628 | Crawford | July 16, 1918 |
| 1,391,128 | Laurie | Sept. 20, 1921 |
| 2,051,394 | Reever | Aug. 18, 1936 |